United States Patent [19]

Vu

[11] Patent Number: 5,613,588
[45] Date of Patent: Mar. 25, 1997

[54] CLUTCH COOLANT FLOW CONTROL DEVICE

[75] Inventor: Thomas H. Vu, Mocksville, N.C.

[73] Assignee: Clark Equipment Company, South Bend, Ind.

[21] Appl. No.: 382,439

[22] Filed: Feb. 2, 1995

[51] Int. Cl.⁶ .................................................... F16D 13/72
[52] U.S. Cl. .................................. 192/113.35; 192/70.12; 188/264 B
[58] Field of Search ........................... 192/113.35, 113.5, 192/113.34, 70.12; 188/71.6, 71.5, 264 B, 264 D, 264 F

[56] References Cited

U.S. PATENT DOCUMENTS

| | | | |
|---|---|---|---|
| 3,010,542 | 11/1961 | Graber | 188/71.5 |
| 3,059,746 | 10/1962 | Christenson | 192/113.35 |
| 3,105,582 | 10/1963 | Ziabicki | 192/113.35 |
| 3,301,367 | 1/1967 | Yokel | 192/113.35 |
| 3,712,437 | 1/1973 | Snyder . | |
| 3,834,503 | 9/1974 | Maurer et al. . | |
| 3,913,616 | 10/1975 | Horsch . | |
| 4,077,500 | 3/1978 | Hickman, Sr. et al. | 192/70.12 X |
| 4,134,483 | 1/1979 | Horsch . | |
| 4,157,750 | 6/1979 | Horsch . | |
| 4,270,647 | 6/1981 | Leber . | |
| 4,529,073 | 7/1985 | Lewis . | |
| 4,540,078 | 9/1985 | Wetrich . | |
| 4,544,055 | 10/1985 | Kronstadt . | |
| 4,557,363 | 12/1985 | Golan . | |
| 4,624,353 | 11/1986 | Sailer et al. . | |
| 4,640,401 | 2/1987 | Koltookian . | |
| 4,644,968 | 2/1987 | Chatterjea . | |
| 4,648,495 | 3/1987 | Vater et al. . | |
| 4,753,332 | 6/1988 | Buber et al. . | |
| 4,759,432 | 7/1988 | Jürgens et al. . | |
| 4,827,784 | 5/1989 | Muller et al. . | |
| 4,860,873 | 8/1989 | Ingaki et al. . | |
| 4,905,812 | 3/1990 | Shepperd . | |
| 5,074,394 | 12/1991 | Motahashi . | |
| 5,469,943 | 11/1995 | Hill et al. | 192/113.35 |

FOREIGN PATENT DOCUMENTS

| | | | |
|---|---|---|---|
| 58-102827 | 6/1983 | Japan | 192/113.35 |
| 4-19426 | 1/1992 | Japan | 192/113.35 |
| 5-321945 | 12/1993 | Japan | 192/113.35 |

*Primary Examiner*—Andrea L. Pitts
*Attorney, Agent, or Firm*—Watts, Hoffmann, Fisher & Heinke

[57] ABSTRACT

The present invention is an improved apparatus for cooling a clutch assembly in a power transmission device with a fluid. The power transmission device includes a shaft, a drive member fixed to the shaft and a driven member supported for rotation by the shaft. The clutch assembly includes at least one clutch plate and at least one friction disk which cooperate to couple the drive member and driven member when engaged and uncouple the drive member and driven member when disengaged. A fluid operated actuator selectively moves the clutch plate and friction disk between engaged and disengaged positions. The improvement comprises a passage in the shaft which conducts a cooling fluid to a location for bathing the clutch assembly and removing heat from the clutch assembly. A bore in the shaft is in communication with the passage at a location between a source of the cooling fluid and the clutch assembly. A valve member is located in the bore and is movable from a first position allowing a first restricted flow of the cooling fluid through the passage and a second position allowing a second relatively greater flow of the cooling fluid though the passage to the clutch assembly. The valve member is movable from the first position to the second position in response to the clutch assembly being actuated between the engaged and disengaged positions. The valve member may also move to a third restricted position at which flow of the cooling fluid is substantially equal to the first restricted flow when the clutch assembly is moved to the engaged position.

37 Claims, 5 Drawing Sheets

CLUTCH COOLANT FLOW CONTROL DEVICE

BACKGROUND OF THE INVENTION

1. Technical Field

The present invention relates generally to a hydraulically actuated clutch assembly in a power transmission, and more particularly, to an apparatus for controlling the flow of a cooling fluid to a fluid bath or "wet" clutch assembly to maximize flow during movement of the clutch assembly components between engaged and disengaged positions and minimize flow at other times.

2. Description of the Prior Art

An industrial vehicle, such as a lift truck or the like, typically includes a fluid-pressure actuated clutch in a power transmission device for driving the vehicle. During operation it is often necessary to hold the vehicle stationary while a fork the lift truck is operated at a speed corresponding to full engine speed without shifting the transmission to the neutral position. It is desirable, in such circumstances, to be able to precisely move or "inch" the vehicle in either the forward or reverse direction in order to achieve accurate positioning of the lift truck and fork in the handling of materials.

Various valve structures have been provided to affect improved gradual engagement and disengagement of the vehicle clutch assembly during "inching" maneuvers in conjunction with the application and release of the vehicle brakes. In such valve structures, the operation of the valve may be either hydraulic or mechanical. When the brakes are actuated, the valve shifts to a position partially interrupting fluid flow from a clutch control valve to effect a controlled partial deactuation of a clutch assembly by maintaining a relatively low fluid pressure.

Fluid bath or "wet" clutch assemblies are also used in the power transmissions to mechanically couple a rotatable drive member on a shaft with a relatively rotatable driven member on the shaft. It is possible that several "wet" clutch assemblies may be used in combination to establish different drive connections throughout the transmission to provide various gear ratios in operation. Each clutch assembly includes a plurality of axially adjacent and alternating friction disks and clutch plates. A group of the friction disks or clutch plates rotate with the drive member and a remaining group of friction disks or clutch plates rotate with the driven member. When the friction disks and clutch plates are axially pressed together into an engaged position, the drive member and driven member are coupled to rotate together. When the friction disks and clutch plates are in a disengaged position, not pressed together, the driven member is free to rotate relative to the drive member and the shaft.

A hydraulic actuator is typically used to move the friction disks and clutch plates of the clutch assembly between the engaged and disengaged positions. The actuator includes a piston-like member located in a fluid chamber usually defined by at least a portion of the drive member. When pressurized fluid is conducted to the chamber, the actuator applies an axial compressive force against the friction disks and clutch plates to establish a mechanical drive connection between the drive and driven members. During movement of the clutch assembly between the fully engaged and fully disengaged conditions or during "inching", the friction disks and clutch plates may slip relative to each other. Heat is generated by the slippage between the friction disks and clutch plates during this movement of the clutch assembly. Too much heat can damage the clutch assembly, thus, involving time consuming and costly repairs. Thus, it is very desirable to remove this heat during actuation movement of the clutch assembly.

To dissipate the heat generated, it is known to bathe the clutch assembly with a cooling fluid. The cooling fluid dissipates the heat developed by the relative slipping between the friction disks and clutch plates. However, constant bathing of the clutch area is not needed because the slipping and heat generation occurs only during movement of the clutch assembly between the engaged and disengaged positions. Flooding the clutch area with cooling fluid also creates viscous drag on the clutch assembly. This viscous drag causes a loss in horsepower and produces additional heat in the clutch assembly at a time when cooling fluid is not necessary.

SUMMARY OF THE INVENTION

The present invention is directed to an apparatus for controlling the flow of cooling fluid to a clutch assembly. The control apparatus of the present invention provides maximum cooling fluid flow to the clutch assembly only when it is needed. That is, cooling is provided only when the clutch assembly moves between the engaged and disengaged positions and relative slippage occurs between the friction disks and clutch plates. Thus, a minimum amount of cooling fluid and a relatively small pump is required to cool the clutch assembly. By providing cooling fluid only when needed, the power loss and heat generation due to viscous drag of the clutch assembly is minimized.

The present invention provides an improved apparatus for cooling a clutch assembly in a power transmission device with a fluid. The power transmission device includes a shaft rotatable about its longitudinal central axis, a drive member fixed to the shaft and a driven member supported for relative rotation by the shaft. A clutch assembly includes at least one clutch plate and at least one friction disk which cooperate to couple the drive member and driven member when engaged and uncouple the drive member and driven member when disengaged. A fluid operated actuator selectively moves the clutch plate and friction disk between engaged and disengaged positions. The improvement comprises a passage in the shaft to conduct a cooling fluid to a location for bathing the clutch assembly with the fluid and removing heat from the clutch assembly. A bore in the shaft is in communication with the passage at a location between a source of the cooling fluid and the clutch assembly. A valve member is located in the bore and is movable from a first restricting position allowing a first relatively low flow of the cooling fluid through the passage and a second relatively unrestricting position allowing a second relatively greater and relatively unrestricted flow of the cooling fluid through the passage to the clutch assembly. The valve member is movable from the first restricting position to the second relatively unrestricting position in response to the clutch assembly being actuated between the engaged and disengaged positions.

In the preferred and illustrated embodiment, the valve member moves to a third restricting position beyond the second relatively unrestricting position to allow a third relatively low flow of the cooling fluid through the passage to the clutch assembly. Preferably, the third relatively low flow is substantially equal to the first relatively low flow. In the illustrated embodiment, the valve member moves to the third restricting position in response to the clutch assembly being moved to the fully engaged position.

The improvement further includes a conduit for fluidly connecting an end surface of the valve member with a clutch actuating fluid source. When the pressure of the actuating fluid is in a predetermined range, the fluid acts on a piston to effect movement of the clutch plate and the friction disk between the engaged and disengaged positions. The valve member is located in the first restricting position when the clutch plate and friction disk are in the disengaged position. The valve member is in the second relatively unrestricting position when the clutch plate and friction disk are moving in either direction between the engaged and disengaged positions. The conduit comprises a second passage in the shaft for conducting the clutch actuating fluid to a clutch actuating piston chamber.

Preferably, the passage extends axially in the shaft along the axis of rotation of the shaft. The conduit preferably comprises a second axially extending passage in the shaft. The conduit is radially offset from the axis of rotation.

BRIEF DESCRIPTION OF THE DRAWINGS

Further features of the present invention will become apparent to those skilled in the art to which the present invention relates from reading the following specification with reference to the accompanying drawings, in which.

DESCRIPTION OF PREFERRED EMBODIMENT

Figure 1:
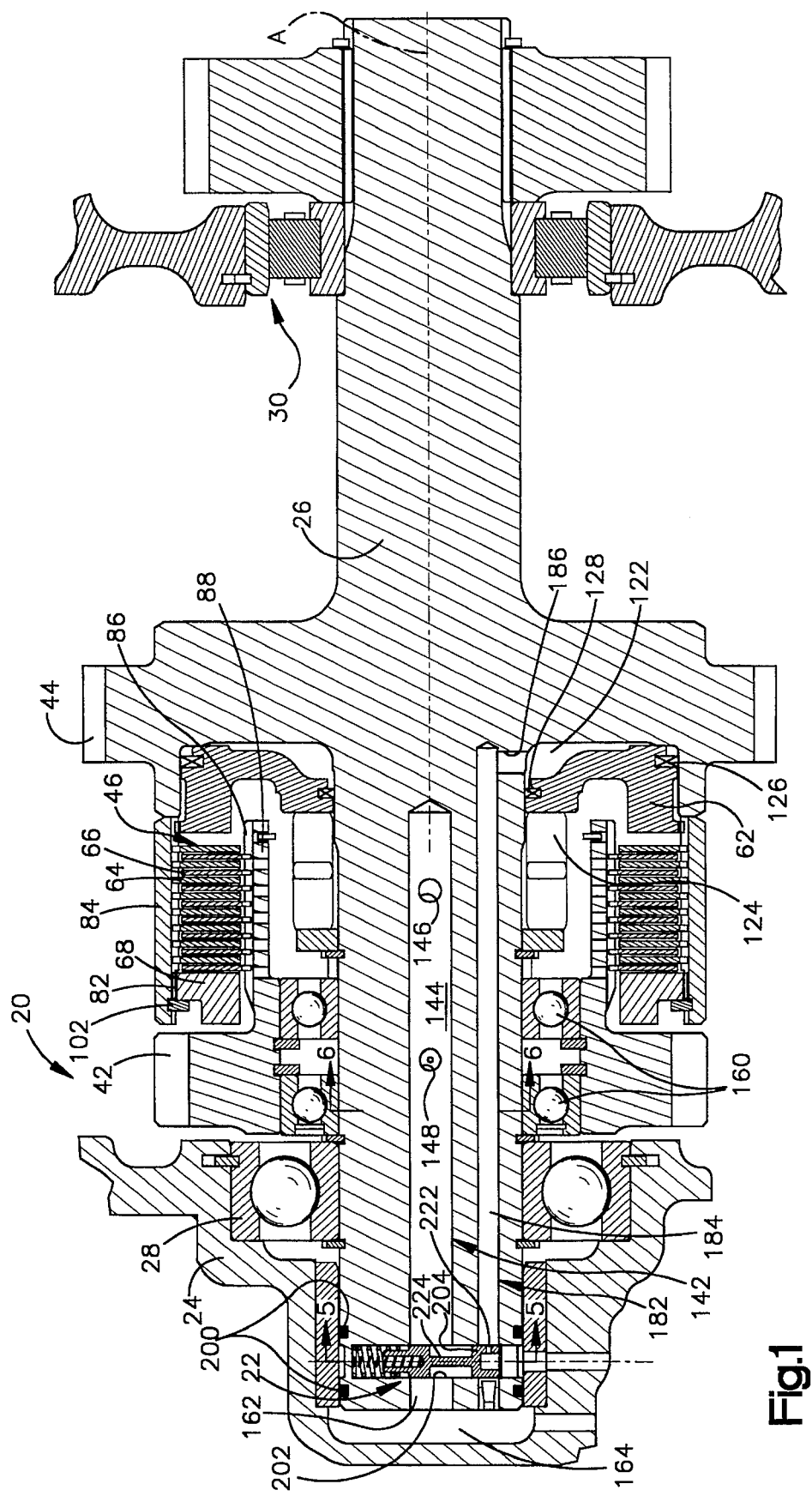
FIG. 1 is a longitudinal cross-sectional view of a portion of a transmission having a clutch coolant control device embodying the present invention.

A transmission 20 having a clutch coolant control device 22, embodying the present invention, is illustrated in FIG. 1. The clutch coolant control device 22 of the present invention is usable in various forms. A preferred embodiment is shown in the drawings and described in detail with the understanding that the description is an example of the invention, and does not limit the invention to the specific illustrated embodiment.

The transmission 20 is intended for use in a vehicle subject to severe operating conditions, such as a tractor, front end loader and the like. The transmission 20 includes a housing 24 and a shaft 26 journaled for rotation about its longitudinal central axis A relative to the housing. Bearings 28, 30 are provided to rotatably support the shaft 26 in to the housing 24. The transmission 20 includes a plurality of axially spaced gears 42, 44 which are supported by the shaft 26.

Either or both of the gears 42 or 44 may be operably connected with a respective known input or output structure (not shown) and vice versa. The gears 42,44 are selectively coupled or uncoupled to provide one of a pair of different gear ratios available in the transmission 20. The gears 42, 44 are selectively coupled or uncoupled in response to actuation of an associated clutch assembly 46. Although only one gear and clutch assembly combination is illustrated, it will be apparent that the present invention is equally applicable to embodiments having more than one clutch assembly.

The gear 44 is fixed to the shaft 26 and is defined here for purposes of example as a drive member of the transmission 20. The gear 42 is supported for by the shaft 26 and is defined here as a driven member. The gear 42 may rotate with, or relative to, the shaft 26. The clutch assembly 46 provides a selectively operable mechanical friction coupling between the drive member 44 and the driven member 42. An axially displaceable and fluid operated piston 62 provides selective actuation of the clutch assembly 46.

The clutch assembly 46 includes a plurality of alternating friction disks 64 and clutch plates 66 which are arranged between a back pressure plate 68 and the piston 62. The back pressure plate 68 is spline connected to the drum 84 and its axial displacement is limited by a suitable snapring 102. The friction disks 64 are connected to an elongated inner splined portion 82 of a drum 84 such that the friction disks rotate with the gear 44 and shaft 26. The friction disks 64 are provided with a friction facing material which is selected in combination with a lubricating and cooling fluid to provide a predetermined coefficient of friction between the friction disks and clutch plates. The clutch plates 66 are connected to elongated outer splines 86 provided on an axial extension 88 of the gear 42 and rotate with the gear.

When sufficient axial pressure is applied by the piston 62 to the friction disks 64 and clutch plates 66, a mechanical drive connection is established, and motion is transmitted, between shaft 26 and driven gear 42. The amount of torque transfer and relative rotation that exists between the shaft 26 and the gear 42 is controlled as a function of the axial compression applied to the friction disks 64 and clutch plates 66. The axial compression is established by the amount of fluid actuating pressure applied to the piston 62 in the clutch assembly 46.

The piston 62 provides an axial compressive force against one end of the clutch assembly 46. The piston 62 is arranged for movement in a direction about the axis A in response to sufficient fluid pressure in a chamber 122 to overcome the force of a spring 124 biasing the clutch assembly 46 to a disengaged condition. In this disengaged position, the friction disks 64 and clutch plates 66 are axially spaced apart a relatively small distance. The piston 62 is appropriately sealed to retain hydraulic pressure in the chamber 122 by a pair of conventional annular seals 126 and 128 fitted in respective grooves in the piston.

During actuation between the engaged and disengaged positions or conditions, the clutch assembly 46 generates heat. Heat is generated from the friction disks 64 and clutch plates 66 slipping relative to each other under the compressive load and while in contact with one another. To dissipate this heat, the present invention includes the device 22 for delivering and controlling a cooling fluid to the clutch assembly 46 in regulated quantities as a function of clutch actuation.

The clutch cooling device 22 controls the flow of cooling fluid to the clutch assembly. A passage 142 (FIG. 1) is provided in the shaft 26 for delivering the cooling fluid to the clutch assembly 46. The passage 142 includes an axially extending passage portion 144 (FIGS. 1–6) centrally located in the shaft 26 along the axis A. The passage 142 further includes at least one exhaust port 146 located in the shaft 26 near the clutch assembly 46. The exhaust port 146 extends transversely from the passage portion 144 for directing cooling fluid radially outwardly to the clutch assembly 46. The passage 142 may have another port 148 to direct cooling fluid to other clutch assemblies or components, such as bearings 160 within the transmission 20.

The cooling fluid is delivered to an open axial end 162 of shaft 26 where the fluid enters the passage portion 144 for delivery to the exhaust port 146 and ultimately to the clutch assembly 46. A cavity 164 is defined by the housing 24 and receives the cooling fluid from a source location 166 under pressure and at a predetermined maximum flow rate. The open axial end 162 of the shaft 26 is located in the cavity 164 so cooling fluid may easily enter the passage 142.

Figure 6:
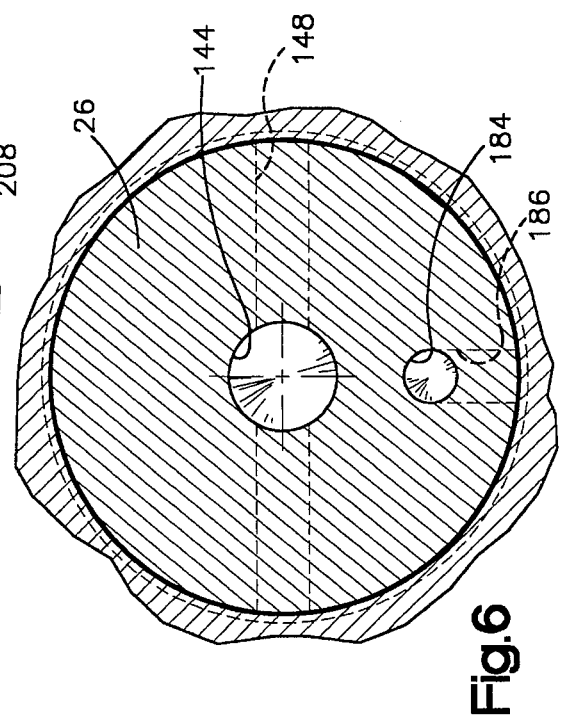
FIG. 6 is a cross-sectional view of another portion of the shaft of the transmission illustrated in FIG. 1., taken approximately along line 6—6 of FIG. 1.

The shaft 26 also includes a second or clutch actuation fluid passage or conduit 182 which is radially offset, as viewed in FIG. 6, from the passage 142 and axis A. This clutch actuation fluid passage 182 has an axially extending portion 184 and a transversely extending end portion 186 which delivers fluid under various pressures to the piston chamber 122. Clutch actuation fluid is delivered from a fluid operated actuator source location 188 such as a pump or control valve arrangement. The clutch actuation fluid is initially delivered when the clutch assembly is in a disengaged position or condition at a relatively low pressure, such as 30 psi or lower.

Figure 5:
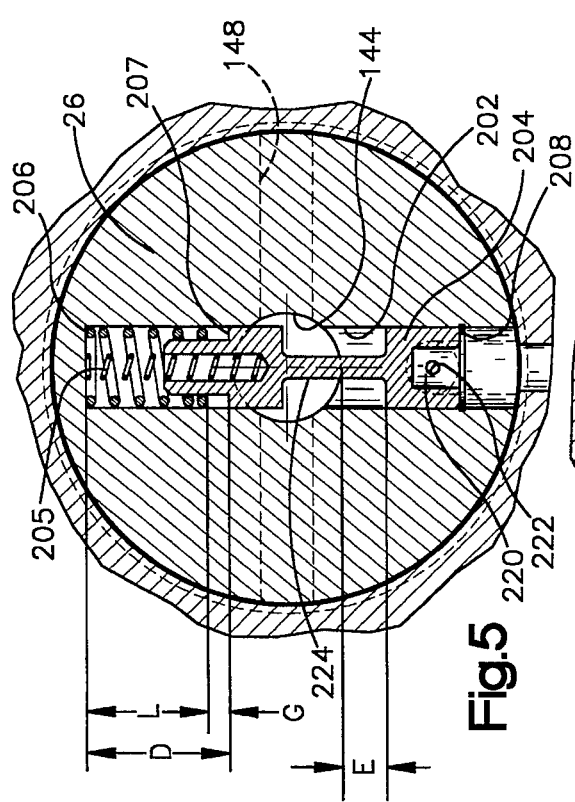
FIG. 5 is a cross-sectional view of a shaft of the transmission illustrated in FIG. 1, taken approximately along line 5—5 of FIG. 1.

As illustrated in FIG. 5, a bore 202 extends transversely to, and in communication with, both the axially extending portions 144, 184 of the passage 142 and clutch actuation fluid passage 182. A movable valve member 204 is located in the bore 202 and defines another portion of the coolant flow control device 22. Seals 200 in grooves in the shaft inhibit fluid leakage axially away from the location of the bore 202 and valve member 204. The valve member 204 is biased toward a restricting position, as illustrated in FIGS. 1 and 5 by a relatively low force spring 205 so that the valve member engages a stop 208 in the form of a snapring at one end portion of the bore 202. A second higher force spring 206 is located about the spring 205 and has a free length L less than the distance D between the closed end of the bore 202 and shoulder 207 of the valve member 204 so a gap G exists. The valve member 204 is movable to various positions in the bore 202 against the biasing force of the spring 205 or springs 205, 206 in a continuous manner as a function of the fluid pressure in the bore.

As illustrated in FIGS. 1 and 5, the valve member 204 is in a first or restricting position of its many possible positions and in which the flow through the coolant passage 142 is at a minimum. Minimal cooling fluid is needed, since the clutch assembly 46 is in a disengaged condition or position and little or no relative slippage is encountered by the friction disks 64 and clutch disks 66 of the clutch assembly to generate the heat. In this initial or start-up situation, the fluid pressure force is at or near 0 psi, so the clutch assembly 46 remains unactuated or disengaged, as illustrated in FIG. 1, but the piston chamber 122 remains filled with fluid. A bleed hole 222 is located in a lower cylindrical chamber 220 in the valve member 204, as viewed in FIG. 5, to vent the chamber 122 and passage 184 to the cylindrical chamber (from where it is returned to tank or source) when fluid pressure is at about 0 psi and when the valve member is in the first position against the stop 208. As the pressure in the bottom of the bore 202 and chamber 220 increases to about 20 or 30 psi, the valve member 204 moves slightly upwardly to the position illustrated in FIG. 2, but the friction disks 64 and clutch plates 66 of the clutch assembly 46 do not yet relatively slip any appreciable amount to generate heat. An axial extent E (FIG. 5) of a reduced diameter portion 224 of the valve 204 is located below the coolant passage 142 when clutch actuation pressure is about 30 psi or less, so maximum flow through the coolant passage is not yet permitted.

Figure 2:
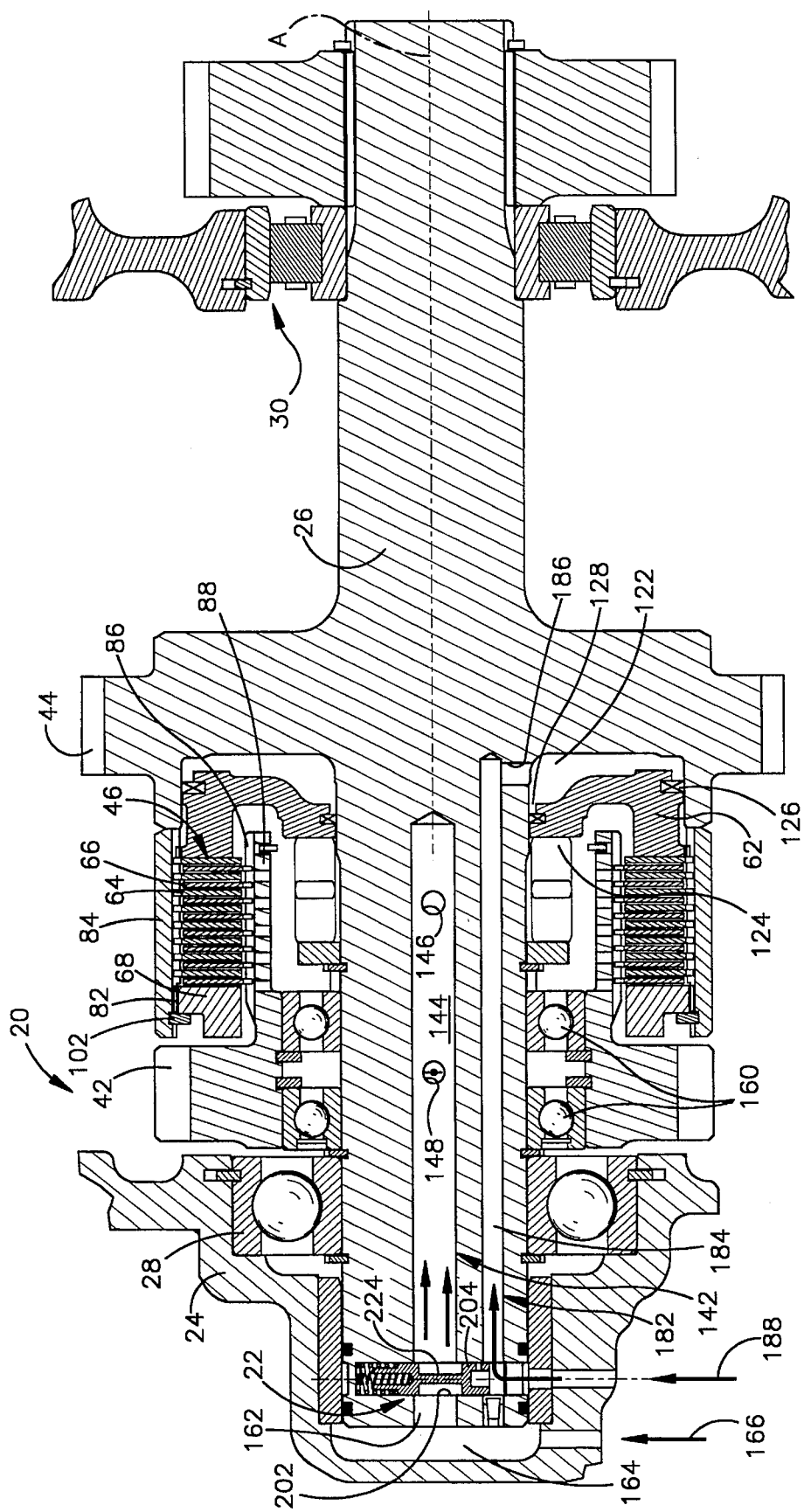
FIGS. 2–4 are views similar to FIG. 1 with parts illustrated in different positions.
Figure 7:
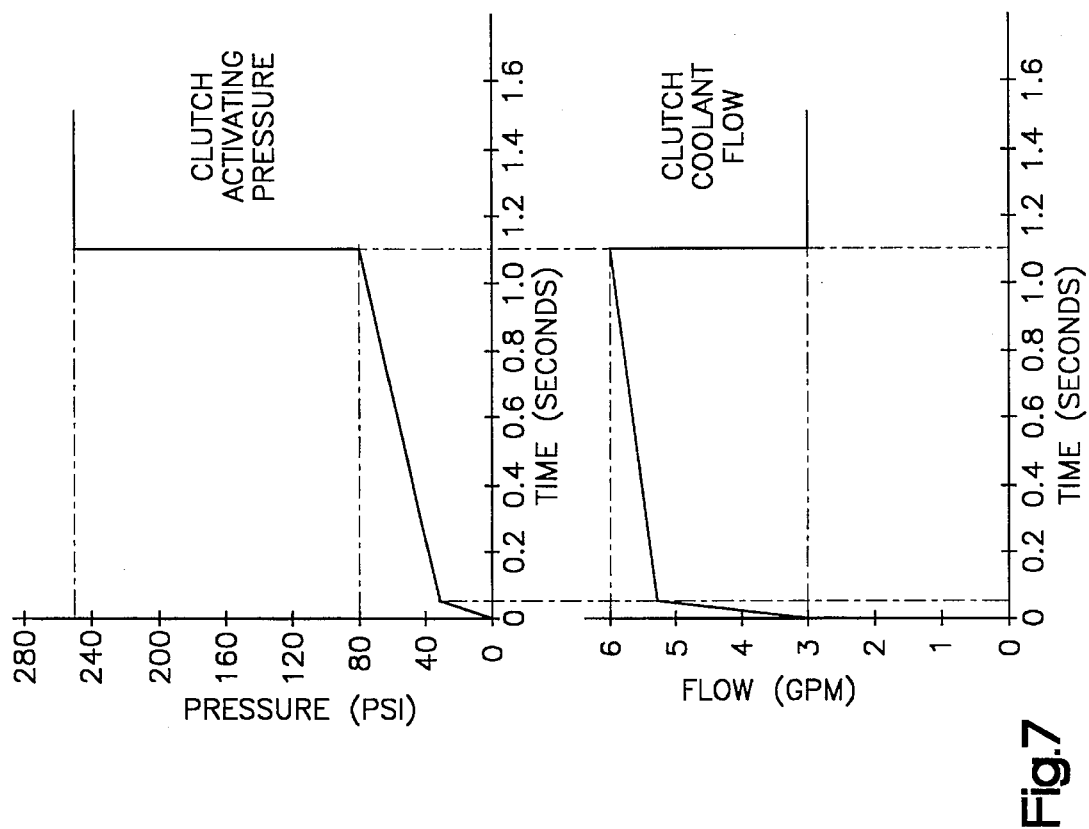
FIG. 7 is a graphic representation of clutch actuation pressure related to clutch coolant flow over time.

During initial actuation of the clutch assembly 46, fluid pressure delivered from the source location 188 increases or "ramps up" to approximately 80 psi. As seen in FIG. 7, during this ramp up period the clutch pressure increases from approximately 20 psi to 80 psi at a controlled rate which is determined by the fluid pressure control system. During this ramp up period a relatively large amount of heat may be generated due to clutch slippage. The fluid force acting on the downwardly facing surfaces of the chamber 220 and valve 204, as illustrated in FIGS. 1 and 5, is exposed to this elevated fluid pressure and forces the valve from the restricting or at rest initial first position as illustrated in FIG. 2 to the relatively unrestricted or second position illustrated in FIG. 3 against the spring 206. This movement of the valve 204 in the bore 202 permits the central reduced diameter portion 224 of the valve to be in a relatively unrestricting position at which a maximum amount of flow in the coolant passage 142 occurs so coolant flow to the clutch assembly 46 is at its greatest. It is at this clutch actuation duration that the friction disks 64 and clutch plates 66 slip relative to one another under a load to generate heat so the maximum coolant flow is needed. A maximum amount of cooling fluid flow is directed to the clutch assembly 46. The cooling fluid then carries away heat generated in the clutch assembly 46 by slippage when the fluid flows away from or out of the clutch assembly to be cooled and recirculated.

As illustrated in FIG. 7, the time for the valve 204 to reach the position in FIG. 2 from the position in FIG. 1 is about 0.05 second. When the clutch actuating pressure is 0 psi, the coolant flow through the passage 142 is about 3 gpm. When the clutch actuating pressure is 30 psi, the coolant flow through the passage 142 is over 5 gpm. The time that the clutch assembly 46 is being moved between the engaged and disengaged positions is relatively short at the 20 to 80 psi clutch actuating pressure, on the order of 1.0 to 1.1 seconds. This is a relatively minimal amount of time that the heat is being generated in the clutch assembly as the valve member 204 moves to the position illustrated in FIG. 3 and coolant flow is at a maximum of about 6 gpm. This minimal cooling demand allows the use of a relatively small volume of fluid and a relatively small and lightweight pump which can be important in some vehicles.

Figure 3:
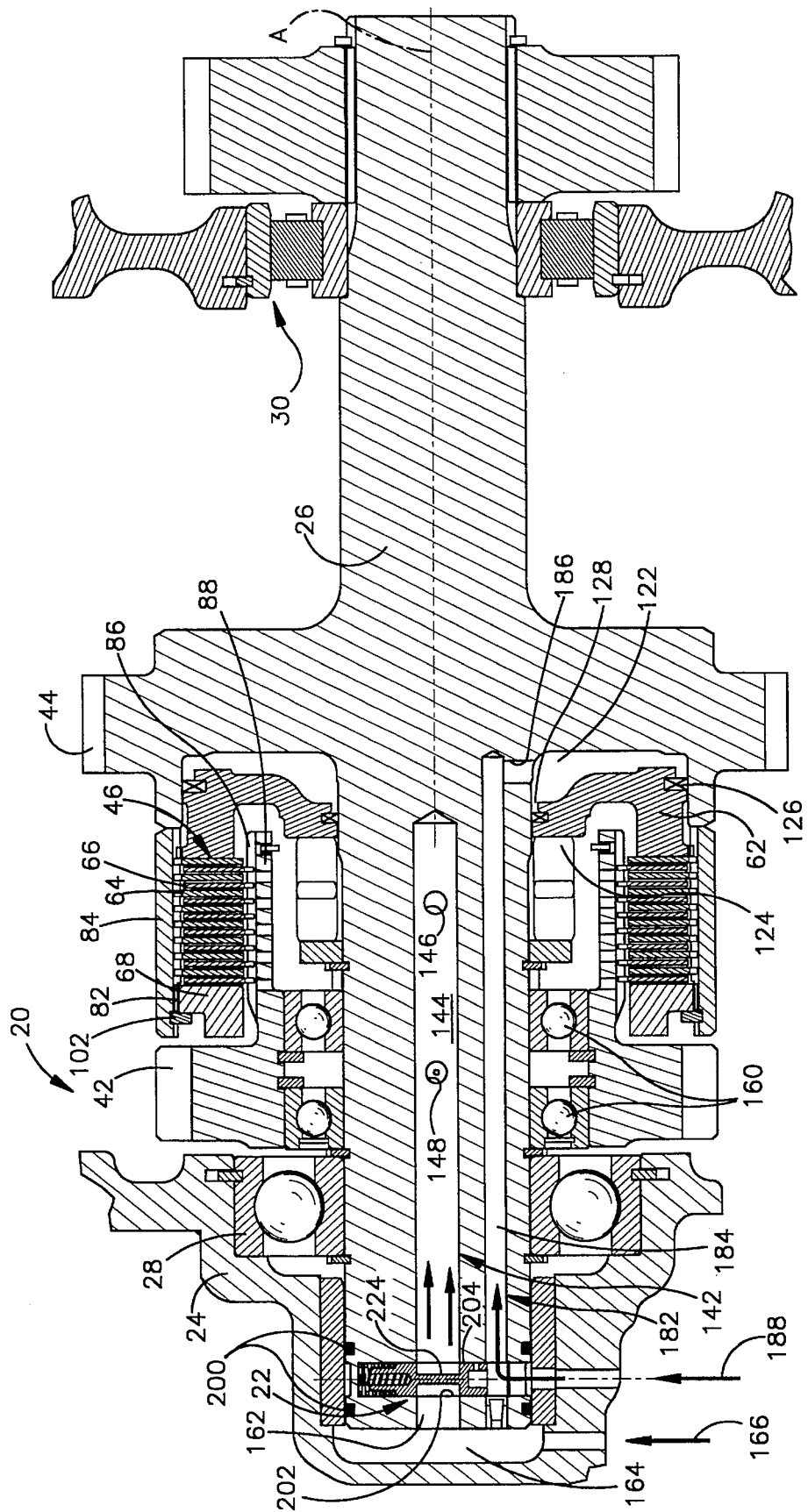
Figure 4:
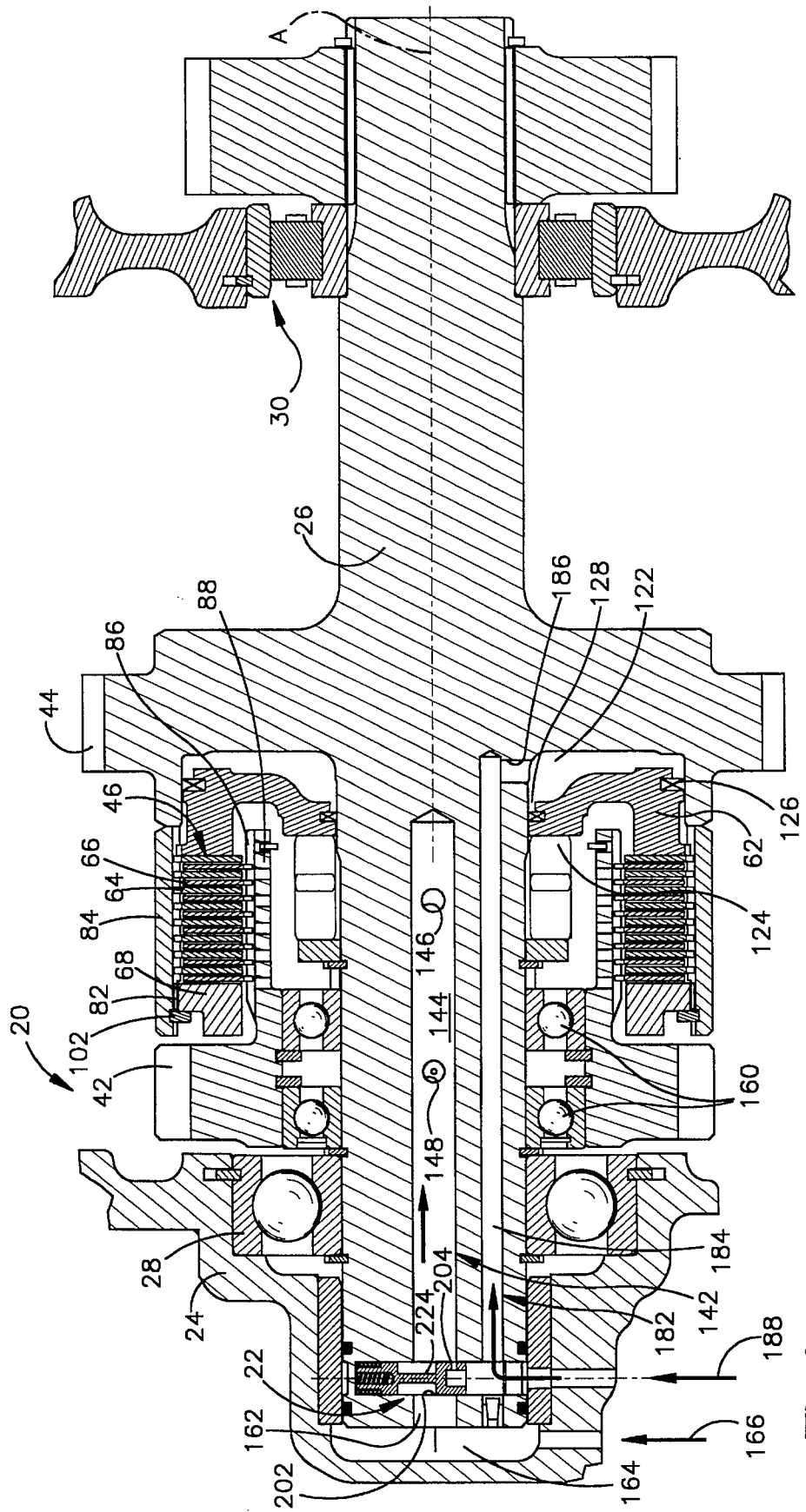

There is no gap between the spring 206 and piston shoulder 207, thus, the force needed to be overcome by the actuating fluid pressure is relatively high to further move the valve member 204 from the position illustrated in FIG. 3. To maintain the clutch assembly 46 actuated and engaged in order to keep the frictional coupling between the drive member or gear 44 and the driven member or gear 42, pressure in the piston chamber 122 is quickly increased from a pressure of 80 psi up to 250 psi. This relatively large actuating fluid pressure exerts the axial force on the clutch assembly 46 to maintain it in an engaged position in which little or no slippage occurs and, therefore, no heat is generated and less coolant flow is needed. At this high fluid actuation pressure, the valve member 204 has moved to a restricting third position as illustrated in FIG. 4, so that flow of coolant fluid through the coolant passage 142 again is at a minimum of about 3 gpm. The coolant fluid flow and the high actuating pressure will be maintained in this condition as long as desired by the operator until a gear ratio, or direction, change is performed.

When the clutch assembly 46 is to be disengaged, the actuating pressure is reduced in the piston chamber 122 from 250 psi to about 0 psi during which some slippage in the clutch assembly 46 occurs. At this time the valve member 204 is again exposed to about 0 psi in the bore 202 and the springs 205, 206 move the valve member back to the first restricting position illustrated in FIG. 1 against the stop 208 (FIG. 5) so a minimum amount of fluid coolant may be directed to the clutch assembly 46.

During "inching" a relatively large amount of clutch slippage typically occurs for an extended period of time. Thus, maximum flow through the coolant passage 142 is desired to limit the heat build-up in the clutch assembly 46.

The physical slippage in the clutch assembly 46 during inching is the same as occurs during shifting, as described above. However, its cause is somewhat different than shifting. During inching the clutch assembly 46 starts in the fully engaged position, as illustrated in FIG. 4. To enable inching, an inching actuator (not shown) such as pedal, pedal portion, switch, lever or other suitable means is manually actuated. The actuator modulates fluid pressure from the fluid operated actuator source location 188 between 20 and 80 psi.

The fluid force acting on the downwardly facing surfaces of the chamber 220 and valve 204, as illustrated in FIGS. 1 and 5, is exposed to this fluid pressure and forces the valve from the position illustrated in FIG. 4 to the position illustrated in FIG. 3 against the springs 205, 206. This movement of the valve 204 in the bore 202 permits the central reduced diameter portion 224 of the valve to be in a position in which a maximum amount of flow in the coolant passage 142 occurs so coolant flow to the clutch assembly 46 is its greatest.

From the above description of a preferred embodiment of the invention, those skilled in the art will perceive improvements, changes and modifications. Such improvements, changes and modifications within the skill of the art are intended to be covered by the appended claims.

Having described at least one preferred embodiment of the invention, what is claimed is:

1. An improved apparatus for cooling a clutch assembly in a power transmission with a fluid in which the power transmission includes a shaft, a drive member fixed to the shaft and a driven member supported for rotation by the shaft, the clutch assembly includes at least one clutch plate and at least one friction disk which cooperate to couple the drive member and driven member when engaged and uncouple the drive member and driven member when disengaged, and a fluid operated actuator selectively moves the clutch plate and friction disk between engaged and disengaged positions, wherein the improvement comprises:

an axially extending passage in the shaft for conducting a cooling fluid to a location to bathe the clutch assembly and to remove heat therefrom;

a transversely extending bore in the shaft in communication with said axially extending passage at a location between a source of the cooling fluid and the clutch assembly;

a clutch actuating fluid source that effects movement of the clutch plate and the friction disk between the engaged and disengaged positions; and a valve member in said transversely extending bore and movable from a first position allowing a first flow of the cooling fluid through said axially extending passage and a second position allowing a second greater flow of the cooling fluid though said axially extending passage, said valve member movable from the first position to the second position in response to an application of pressurized fluid from said actuating fluid source to the clutch assembly.

2. The improvement of claim 1 further including a conduit for fluidly connecting an end surface of said valve member with said clutch actuating fluid source.

3. The improvement of claim 2 wherein the valve member is located in the first position when the clutch plate and friction disk are in one of a disengaged position and an engaged position and the valve member is in the second position when the clutch plate and friction disk are moving between the engaged and disengaged positions.

4. The improvement of claim 2 wherein the conduit comprises a second axially extending passage in the shaft for conducting the clutch actuating fluid to a clutch actuating piston chamber.

5. The improvement of claim 2 wherein a chamber is defined in an axial end of said valve member, said chamber being in fluid communication with the clutch actuating fluid source and said valve member includes a bleed hole for venting fluid flow between said chamber and said conduit when said valve member is in the first position.

6. The improvement of claim 1 wherein said valve member includes a first valve portion having a first flow restricting size and spaced along the direction of movement of the valve member from a second valve portion having a second flow restricting size greater than said first flow restricting size, said first valve portion disposed adjacent said axially extending passage and substantially spanning said axially extending passage when said valve member is in the second position.

7. The improvement of claim 6 wherein said first valve portion is located intermediate a pair of second valve portions having substantially equal flow restricting sizes.

8. The improvement of claim 7 wherein one of said second valve portions is at least partially located in said axially extending passage when said valve member is in the first position.

9. The improvement in claim 8 wherein the other of said second valve portions is at least partially located in said axially extending passage when said valve member is located in a third position allowing a flow of the cooling fluid less than the second flow when said clutch assembly is in the engaged position.

10. The improvement in claim 1 wherein said valve member is located in a third position allowing a flow of the cooling fluid less than the second flow when said clutch assembly is in the engaged position.

11. An improved apparatus for cooling a clutch assembly in a power transmission with a fluid in which the power transmission includes a shaft, a drive member fixed to the shaft and a driven member supported for rotation by the shaft, the clutch assembly includes at least one clutch plate and at least one friction disk which cooperate to couple the drive member and driven member when engaged and uncouple the drive member and driven member when disengaged, and a fluid operated actuator selectively moves the clutch plate and friction disk between engaged and disengaged positions, wherein the improvement comprises:

a passage in the shaft for conducting a cooling fluid to a location to bathe the clutch assembly and to remove heat therefrom;

a bore in the shaft in communication with said passage at a location between a source of the cooling fluid and the clutch assembly;

a clutch actuating fluid source that effects movement of the clutch plate and the friction disk between the engaged and disengaged positions;

a valve member in said bore and movable from a first position allowing a first flow of the cooling fluid through said passage and a second position allowing a second greater flow of the cooling fluid though said passage to said clutch assembly, said valve member movable from the first position to the second position in response to an application of pressurized fluid from said actuating fluid source to the clutch assembly.

12. The improvement of claim 11 further including a conduit for fluidly connecting an end surface of said valve member with said clutch actuating fluid source.

13. The improvement of claim 12 wherein the valve member is located in the first position when the clutch plate and friction disk are in one of a disengaged and engaged position and the valve member is in the second position when the clutch plate and friction disk are moving between the engaged and disengaged positions.

14. The improvement of claim 12 wherein the conduit comprises a second passage in the shaft for conducting the clutch actuating fluid to a clutch actuating piston chamber.

15. The improvement of claim 12 wherein a chamber is defined in an axial end of said valve member, said chamber being in fluid communication with the clutch actuating fluid source and said valve member includes a bleed hole for venting fluid flow between said chamber and said conduit when said valve member is in the first position.

16. The improvement of claim 11 wherein said valve member includes a first valve portion having a first flow restricting size and spaced along the direction of movement of the valve member from a second valve portion having a second flow restricting size greater than said first flow restricting size, said first valve portion disposed adjacent said axially extending passage and substantially spanning said axially extending passage when said valve member is in the second position.

17. The improvement in claim 11 wherein said valve member is located in a third position allowing a flow of the cooling fluid less than the second flow when said clutch assembly is in the engaged position.

18. An apparatus for actuating and cooling a clutch assembly in a power transmission device, said apparatus comprising:

a shaft supported for rotation about its longitudinal central axis;

a driving member and a driven member supported by said shaft, one of said driving and driven members fixed to said shaft for rotation therewith and the other of said members rotatable relative to said shaft;

a clutch assembly for coupling together said driving member and said driven member for rotation with said shaft;

a first passage in said shaft for conducting a cooling fluid to said clutch assembly;

a second passage in said shaft for conducting clutch actuating fluid to a piston and chamber of the clutch assembly from a source of pressurized fluid capable of delivering clutch actuating fluid at various pressures;

a bore in said shaft, said bore in communication with said first and second passages; and a valve member located in said bore, said valve member having an end surface in communication with said clutch actuating fluid source, said valve member movable from a first position allowing a first flow of the cooling fluid through said first passage and a second position allowing a second greater flow of the cooling fluid though said first passage, said valve member movable between the first position and the second position in response to the clutch actuating fluid pressure being varied between a first pressure at which said clutch assembly is disengaged and a second greater pressure at which said clutch assembly is engaged.

19. The apparatus in claim 18 wherein said first and second passages extend in an axial direction within said shaft for substantially their entire lengths.

20. The apparatus in claim 19 wherein said bore extends transversely to said first and second passages.

21. The apparatus in claim 18 wherein said valve member blocks flow through said second passage when the clutch actuating fluid is at a pressure which is less than or equal to the first pressure.

22. The improvement of claim 18 wherein a chamber is defined in an axial end of said valve member, said chamber being in fluid communication with the source of clutch actuating fluid and said valve member further includes a bleed hole for venting fluid flow between said chamber and said second passage when said valve member is in the first position.

23. The improvement of claim 18 wherein said valve member includes a first valve portion having a first flow restricting size and spaced along the direction of movement of the valve member from a second valve portion having a second flow restricting size greater than said first flow restricting size, said first valve portion disposed adjacent said axially extending passage and substantially spanning said axially extending passage when said valve member is in the second position.

24. The improvement in claim 18 wherein said valve member is located in a third position allowing a flow of the cooling fluid less than the second flow when said clutch assembly is in the engaged position.

25. An improved apparatus for cooling a clutch assembly in a power transmission with a fluid in which the power transmission includes a shaft, a drive member supported for rotation by the shaft and a driven member supported for rotation by the shaft, the clutch assembly includes at least one clutch plate and at least one friction disk which cooperate to couple the drive member and driven member for joint rotation when engaged and uncouple the drive member and driven member for relative rotation when disengaged, and a fluid operated actuator selectively moves the clutch plate and friction disk between engaged and disengaged positions, wherein the improvement comprises:

a passage for conducting a cooling fluid to a location to bathe the clutch assembly and to remove heat therefrom;

a valve member in communication with said passage and movable among
a) a first position allowing a first flow of the cooling fluid through said passage,
b) a second position allowing a second greater flow of the cooling fluid though said passage to said clutch assembly, and
c) a third position, beyond the second position relative to the first position, allowing a third flow of the cooling fluid, the third flow less than the second flow; and said valve member movable among the first, second and third positions as a function of the clutch assembly being actuated among fully engaged, slipping and fully disengaged conditions.

26. The improvement of claim 25 further including a conduit for fluidly connecting an end surface of said valve member with a clutch actuating fluid source to effect movement of the clutch assembly among the fully engaged, slipping and disengaged conditions.

27. The improvement of claim 26 wherein the conduit extends longitudinally in the shaft for conducting the clutch actuating fluid to a clutch actuating piston chamber.

28. The improvement of claim 25 wherein said passage is located in the shaft and has a portion that extends longitudinally in the shaft, said valve member located in a bore in the shaft, said bore in communication with said passage.

29. The improvement of claim 25 wherein the valve member is located in the first position when the clutch assembly is in the fully disengaged condition, the valve member is in the second position when the clutch assembly is in the slipping condition and the valve member is in the third position when the clutch assembly is in the fully engaged condition.

30. The improvement of claim 25 wherein said valve member is located in the second position when the valve member is exposed to inching pressure supplied by the fluid operated actuator.

31. A transmission including an apparatus for actuating and cooling a clutch assembly in a power transmission device, said apparatus comprising:

a shaft supported for rotation about its longitudinal central axis;

a driving member and a driven member supported by said shaft;

a clutch assembly for selectively coupling together said driving member and said driven member for joint rotation;

a first passage in said shaft for conducting a cooling fluid to said clutch assembly;

a second passage in said shaft for conducting clutch actuating fluid to a piston and chamber of the clutch assembly from a source capable of delivering clutch actuating fluid at varying pressures;

a bore in said shaft, said bore in communication with said first and second passages; and a valve member located in said bore, said valve member having an end surface in communication with said clutch actuating fluid source, said valve member movable among a) a first position allowing a first flow of the cooling fluid through said passage, b) a second position allowing a second greater flow of the cooling fluid though said passage to said clutch assembly, and c) a third position, beyond the second position relative to the first position, allowing a third flow of the cooling fluid, the third flow less than the second flow; and said valve member movable among the first, second and third positions as a function of the clutch assembly being actuated among fully engaged, slipping and fully disengaged conditions.

32. A method of cooling a clutch assembly in a power transmission with a fluid in which the power transmission includes a shaft, a drive member fixed to the shaft and a driven member supported for rotation by the shaft, the clutch assembly includes at least one clutch plate and at least one friction disk which cooperate to couple the drive member and driven member when engaged and uncouple the drive member and driven member when disengaged, and in which a fluid operated actuator selectively moves the clutch plate and friction disk between engaged and disengaged positions, wherein said method comprises the steps of:

conducting a cooling fluid through an axially extending passage in the shaft to a location to bathe the clutch assembly and to remove heat therefrom;

communicating a transversely extending bore in the shaft with the axially extending passage at a location between a source of the cooling fluid and the clutch assembly; and moving a valve member in said transversely extending bore between a first position allowing a first flow of the cooling fluid through the axially extending passage and a second position allowing a second greater flow of the cooling fluid though the axially extending passage, said step of moving the valve member between the first position to the second position is performed in response to the clutch assembly being actuated between engaged and disengaged positions.

33. The method of claim 32 further including the step of fluidly connecting an end surface of said valve member with a clutch actuating fluid source that effects movement of the clutch plate and the friction disk between the engaged and disengaged positions.

34. An improved apparatus for cooling a clutch assembly in a power transmission with a fluid in which the power transmission includes a shaft, a drive member fixed to the shaft and a driven member supported for rotation by the shaft, the clutch assembly includes at least one clutch plate and at least one friction disk which cooperate to couple the drive member and driven member when engaged and uncouple the drive member and driven member when disengaged, and a fluid operated actuator selectively moves the clutch plate and friction disk between engaged and disengaged positions, wherein the improvement comprises:

an axially extending passage in the shaft for conducting a cooling fluid to a location to bathe the clutch assembly and to remove heat therefrom;

a transversely extending bore in the shaft in communication with said axially extending passage at a location between a source of the cooling fluid and the clutch assembly;

a valve member in said transversely extending bore and movable from a first position allowing a first flow of the cooling fluid through said axially extending passage and a second position allowing a second greater flow of the cooling fluid though said axially extending passage, said valve member movable from the first position to the second position in response to the clutch assembly being actuated between engaged and disengaged positions; and said valve member located in a third position allowing a flow of the cooling fluid less than the second flow when said clutch assembly is in the engaged position.

35. An improved apparatus for cooling a clutch assembly in a power transmission with a fluid in which the power transmission includes a shaft, a drive member fixed to the shaft and a driven member supported for rotation by the shaft, the clutch assembly includes at least one clutch plate and at least one friction disk which cooperate to couple the drive member and driven member when engaged and uncouple the drive member and driven member when disengaged, and a fluid operated actuator selectively moves the clutch plate and friction disk between engaged and disengaged positions, wherein the improvement comprises:

a passage in the shaft for conducting a cooling fluid to a location to bathe the clutch assembly and to remove heat therefrom;

a bore in the shaft in communication with said passage at a location between a source of the cooling fluid and the clutch assembly;

a valve member in said bore and movable from a first position allowing a first flow of the cooling fluid through said passage and a second position allowing a second greater flow of the cooling fluid though said passage to said clutch assembly, said valve member movable from the first position to the second position in response to the clutch assembly being actuated between engaged and disengaged positions;

said valve member located in a third position allowing a flow of the cooling fluid less than the second flow when said clutch assembly is in the engaged position.

36. An improved apparatus for cooling a clutch assembly in a power transmission with a fluid in which the power transmission includes a shaft, a drive member fixed to the shaft and a driven member supported for rotation by the shaft, the clutch assembly includes at least one clutch plate and at least one friction disk which cooperate to couple the drive member and driven member when engaged and uncouple the drive member and driven member when disengaged, and a fluid operated actuator selectively moves the clutch plate and friction disk between engaged and disengaged positions, wherein the improvement comprises:

an axially extending passage in the shaft for conducting a cooling fluid to a location to bathe the clutch assembly and to remove heat therefrom;

a transversely extending bore in the shaft in communication with said axially extending passage at a location between a source of the cooling fluid and the clutch assembly; and a valve member in said transversely extending bore and movable from a first position allowing a first flow of the cooling fluid through said axially extending passage and a second position allowing a second greater flow of the cooling fluid though said axially extending passage, said valve member movable from the first position to the second position in response to the clutch assembly being actuated between engaged and disengaged positions;

said valve member including a first valve portion having a first flow restricting size and spaced along the direction of movement of the valve member from a second valve portion having a second flow restricting size greater than said first flow restricting size, said first valve portion disposed adjacent said axially extending passage and substantially spanning said axially extending passage when said valve member is in the second position.

37. An improved apparatus for cooling a clutch assembly in a power transmission with a fluid in which the power transmission includes a shaft, a drive member fixed to the shaft and a driven member supported for rotation by the shaft, the clutch assembly includes at least one clutch plate and at least one friction disk which cooperate to couple the drive member and driven member when engaged and uncouple the drive member and driven member when disengaged, and a fluid operated actuator selectively moves the clutch plate and friction disk between engaged and disengaged positions, wherein the improvement comprises:

a passage in the shaft for conducting a cooling fluid to a location to bathe the clutch assembly and to remove heat therefrom;

a bore in the shaft in communication with said passage at a location between a source of the cooling fluid and the clutch assembly;

a valve member in said bore and movable from a first position allowing a first flow of the cooling fluid through said passage and a second position allowing a second greater flow of the cooling fluid though said passage to said clutch assembly, said valve member movable from the first position to the second position in response to the clutch assembly being actuated between engaged and disengaged positions;

said valve member including a first valve portion having a first flow restricting size and spaced along the direction of movement of the valve member from a second valve portion having a second flow restricting size greater than said first flow restricting size, said first valve portion disposed adjacent said axially extending passage and substantially spanning said axially extending passage when said valve member is in the second position.

* * * * *